US012798122B2

(12) United States Patent
Merritt et al.

(10) Patent No.: US 12,798,122 B2
(45) Date of Patent: Nov. 17, 2026

(54) ARRAYED VACUUM END OF ARM TOOL

(71) Applicant: ILLINOIS TOOL WORKS INC., Glenview, IL (US)

(72) Inventors: Brian Keith Merritt, Easley, SC (US); Brett Alan Stripe, Piedmont, SC (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1087 days.

(21) Appl. No.: 17/954,057

(22) Filed: Sep. 27, 2022

(65) Prior Publication Data

US 2024/0100720 A1 Mar. 28, 2024

Related U.S. Application Data

(60) Provisional application No. 63/248,900, filed on Sep. 27, 2021.

(51) Int. Cl.

*B25J 15/06* (2006.01)
*B25J 9/16* (2006.01)
*B25J 15/02* (2006.01)

(52) U.S. Cl.

CPC ......... *B25J 15/0641* (2013.01); *B25J 9/1612* (2013.01); *B25J 15/02* (2013.01)

(58) Field of Classification Search

CPC ...... B25J 15/0641; B25J 9/1612; B25J 15/02; B25J 15/0633; B25J 15/0616
USPC .................................................. 294/183, 185
See application file for complete search history.

(56) References Cited

U.S. PATENT DOCUMENTS 4,073,602 A * 2/1978 Cagle ........................ F04F 5/20 294/64.2
5,059,088 A * 10/1991 Klein ..................... B65G 47/91 294/186
6,131,973 A * 10/2000 Trudeau ............... B65G 47/917 294/186
6,354,811 B1 * 3/2002 Ota ..................... F04B 27/1804 137/596.17
6,860,534 B2 * 3/2005 Vogel ................... B65G 47/918 294/188
7,040,679 B2 * 5/2006 Fukano ................ B65G 47/911 294/64.3
7,717,482 B2 * 5/2010 Iwasaki ................ B25J 15/0616 294/64.3
10,371,216 B2 * 8/2019 Smid ..................... F16D 25/123
2010/0040450 A1 * 2/2010 Parnell .................. B66C 1/0256 414/752.1
2011/0254298 A1 * 10/2011 Lomerson, Jr. ...... B25J 15/0616 294/188
2016/0033540 A1 * 2/2016 Drynkin ............. G01N 35/0099 901/2

* cited by examiner

*Primary Examiner* — Paul T Chin
(74) *Attorney, Agent, or Firm* — Pauley Erickson & Swanson

(57) ABSTRACT

A vacuum head and corresponding method for moving product at the end of a robotic arm includes a housing having a product contact surface. An array of at least two rows and at least three ranks of valves are arranged with respect to the product contact surface. A solenoid is connected with respect to each of the valves to selectively activate air pressure in one or more valves thereby enabling multiple switchable zones on the product contact surface and thereby enable transfer of product between stations.

12 Claims, 3 Drawing Sheets

ARRAYED VACUUM END OF ARM TOOL

CROSS REFERENCE TO RELATED APPLICATION

This application claims the benefit of U.S. Provisional Application Ser. No. 63/248,900, filed on 27 Sep. 2021. The co-pending provisional application is hereby incorporated by reference herein in its entirety and is made a part hereof, including but not limited to those portions which specifically appear hereinafter.

BACKGROUND OF THE INVENTION

This invention relates generally to a device for use in production and packaging that can selectively move products between stations in a packaging or similar industrial and/or manufacturing process.

Many industrial and/or manufacturing processes require movement or transfer of product between stations such as from an infeed conveyor to a palletizer in a packaging process. Such transfer is often accomplished with a robotic arm for picking and placing the product. End of arm tools (EOAT) may be used on the robotic arms and may include clamps, fingers, vacuums and/or other EOAT for picking up and maintaining control of the product.

Typical vacuum EOAT include a vacuum zone on a contact surface of the EOAT which provides directed suction to pick up and maintain control of a product. However, typical vacuum EOAT do not include the high flexibility to be able to pick up multiple different case/product sizes and configurations within one layout of vacuum zones while also maintaining higher product speed throughput at the palletizer. Typically, these vacuum zones are laid out to meet a specific finite number of cases and picking orientation to satisfy the minimal speed and product configurations for the customer. These designs present challenges to users if there is a need for higher speed capability in the future or if product dimension changes, resulting in additional components, equipment, or change parts to run on their palletizer.

A need exists for a system that is flexible and capable of running with a range of product dimensions and at a range of speeds.

SUMMARY OF THE INVENTION

The invention generally relates to a system and method for a dual row vacuum end of arm tool (EOAT) that is configured at the end of a robotic arm.

The dual row vacuum EOAT is preferably mounted to a robotic arm used in palletizing application. The EOAT utilizes vacuum to pick up products, typically corrugated cases or cartons filled with products. The EOAT typically picks a predetermined number of cases of the same SKU per cycle. The predetermined number of cases is preferably and typically greater than one for cycle time. The robot then lifts the product from an infeed conveyor system to a pallet in an outfeed stacking conveyor and is placed in a predefined unit load pattern used for shipping or storing the product. The robot may serve multiple lines running different SKUs and multiple unit load patterns by alternating infeeds as demanded.

The dual row vacuum EOAT of the subject invention preferably maximizes the density of vacuum zones for more flexibility in picking different product sizes and multiple pre-collated case configurations while minimizing the payload added to the EOAT in order to stay within payload limits of typically high-speed palletizing robots. By picking different pre-collated configurations, this minimizes robot motion and thus reduces cycle time over other end of arm tools without the need to have multiple different tool heads.

Other objects and advantages will be apparent to those skilled in the art from the following detailed description taken in conjunction with the appended claims and drawings.

DETAILED DESCRIPTION OF THE INVENTION

Figure 1:
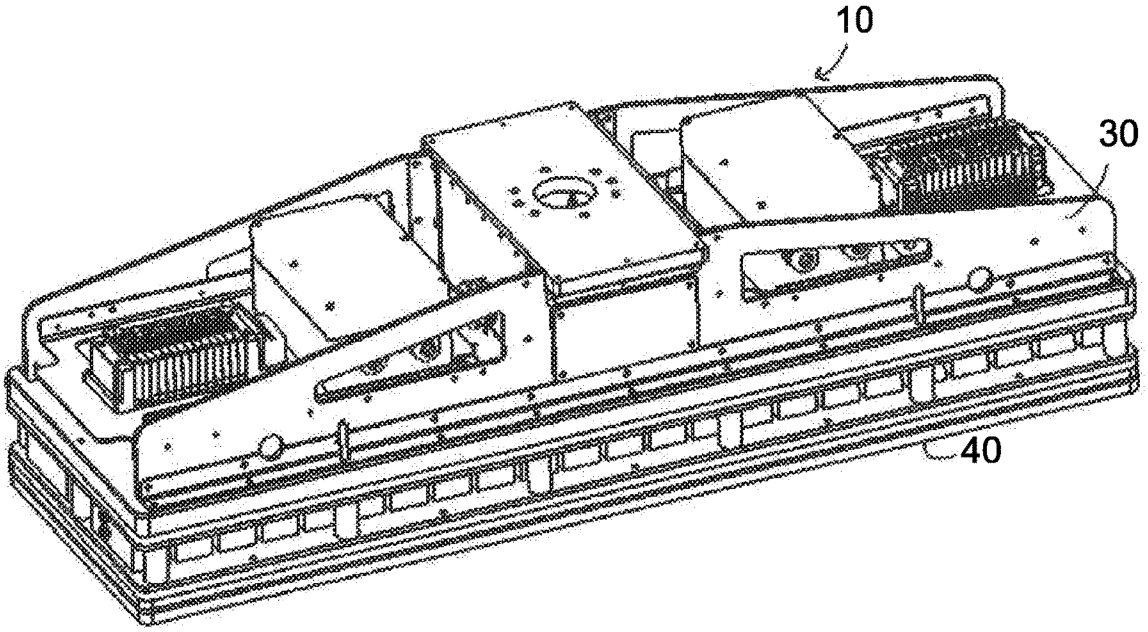
FIG. 1 is a side perspective view of a dual row vacuum end of arm tool according to a preferred embodiment of this invention.
Figure 2:
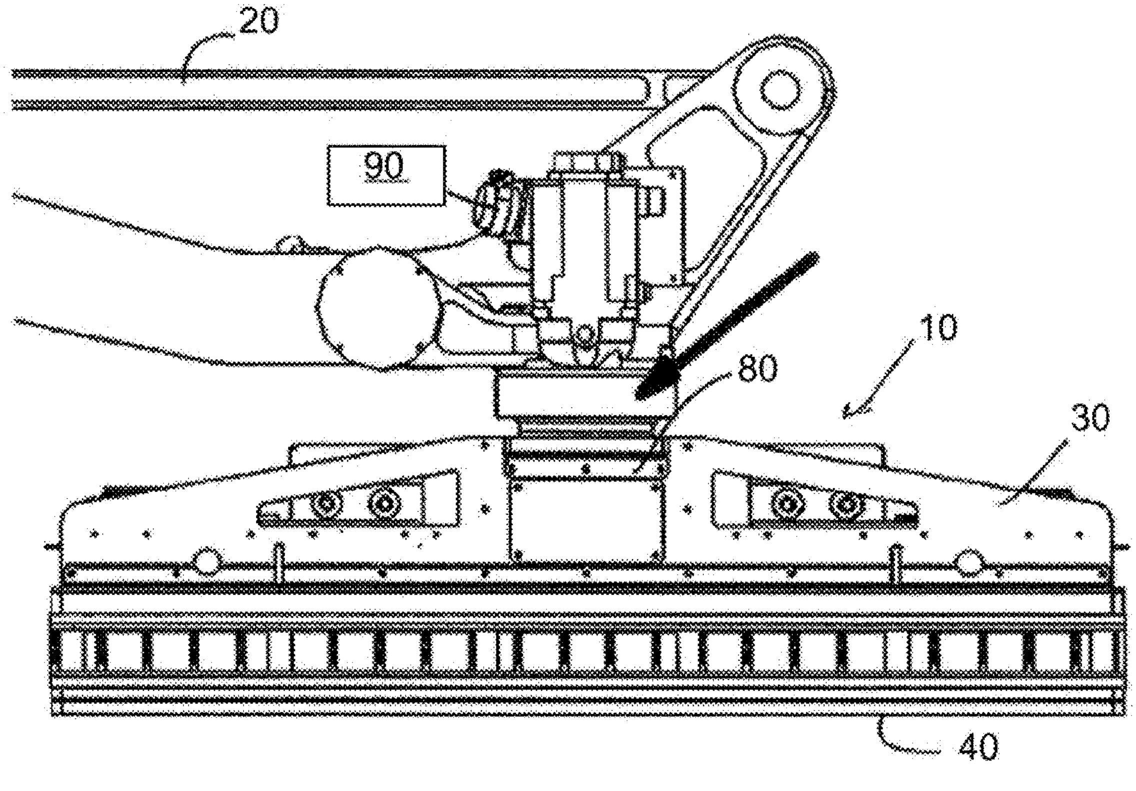
FIG. 2 is a side view of the dual row vacuum EOAT shown in FIG. 1 attached to a robot arm.

FIG. 1 shows a dual row vacuum end of arm tool (EOAT) according to a preferred embodiment of this invention. As shown in FIG. 2, the dual row vacuum EOAT is preferably mounted to a robotic arm used in palletizing application. The dual row vacuum EOAT utilizes vacuum to pick up products, typically corrugated cases or cartons filled with products. The arrayed vacuum EOAT typically picks a predetermined number of cases of the same SKU per cycle. The predetermined number of cases is preferably and typically greater than one for cycle time. The robot then lifts the product from an infeed conveyor system to a pallet in an outfeed stacking conveyor and is placed in a predefined unit load pattern used for shipping or storing the product. The robot may serve multiple lines running different SKUs and multiple unit load patterns by alternating infeeds as demanded.

As shown in variously in the figures, a vacuum head 10 for moving product at the end of a robotic arm 20 includes a housing 10 having a product contact surface 40. The product contact surface 40 is preferably a generally planar surface including multiple suction points for picking up and maintaining control of a product, such as a carton.

An array of at least two rows and at least three ranks of valves 50 are preferably positioned within the housing 10. The array may include two rows and more than twenty ranks of valves 50 such as shown in the figures or may be configured to include more than two rows and a desired number of ranks depending on the intended application. The arrayed or dual row vacuum EOAT maximizes the density of vacuum zones for more flexibility in picking different product sizes and multiple pre-collated case configurations while minimizing the payload added to the EOAT in order to stay within payload limits of typically high-speed palletizing robots. By picking different pre-collated configurations, this minimizes robot motion and thus reduces cycle time over other end of arm tools without the need to have multiple different tool heads.

As shown in FIGS. 2-5, each valve 50 preferably comprises an air powered spring mechanism 55. Each air powered spring mechanism 55 preferably includes a separate actuatable spring that is switchable between an on position and an off position. As such, each valve 50 is separately adjustable between an on position and an off position within the array. Each air powered spring mechanism 55 extends directly to a channel 60 on the product contact surface 40.

A solenoid 80 is connected with respect to each of the valves 50 to selectively activate air pressure in one or more valves 50 thereby enabling multiple switchable zones on the product contact surface. Further, a PLC 100 may be connected with respect to the solenoid 80 to automatically activate zones based on a desired product configuration.

The vacuum head 10 further includes a central air manifold 70 within the housing 30 connected between the robotic arm 20 and the plurality of valves 50. In addition, a powered vacuum generator 90 may be positioned within the robotic arm to provide a vacuum to the central air manifold 70 and, thus, the plurality of valves 50 that are configured in the on position.

Figure 3:
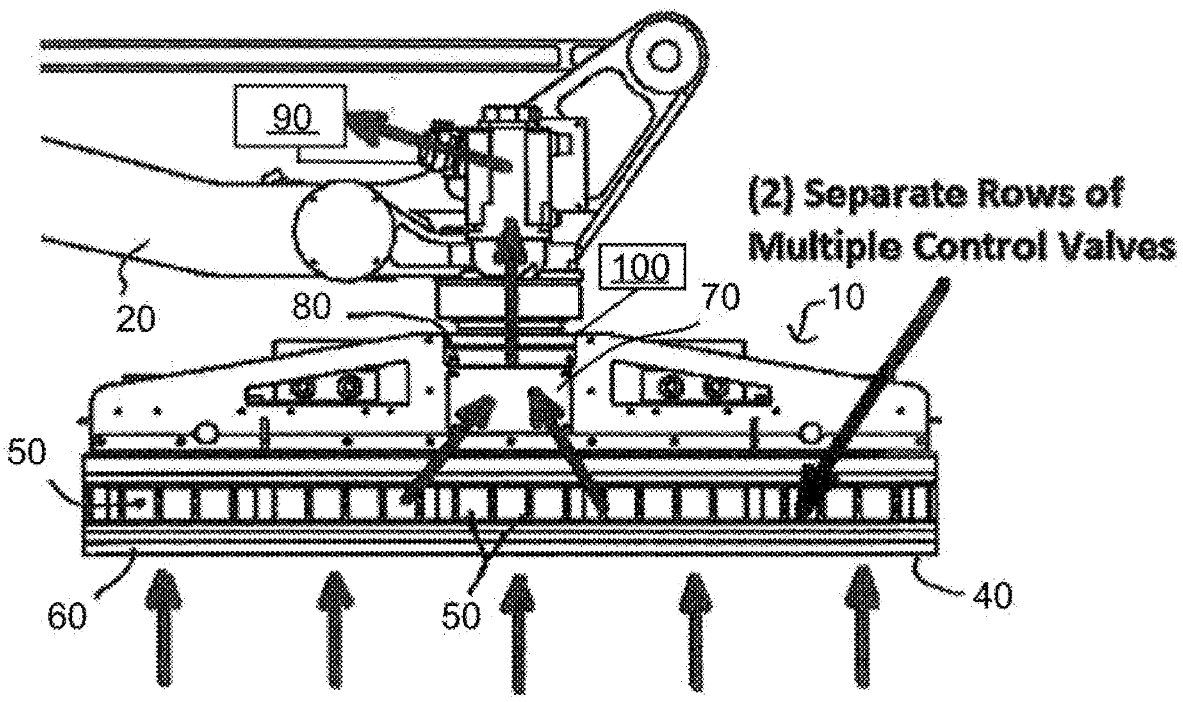
FIG. 3 is a cross-sectional side view of the dual row vacuum EOAT shown in FIG. 1.
Figure 4:
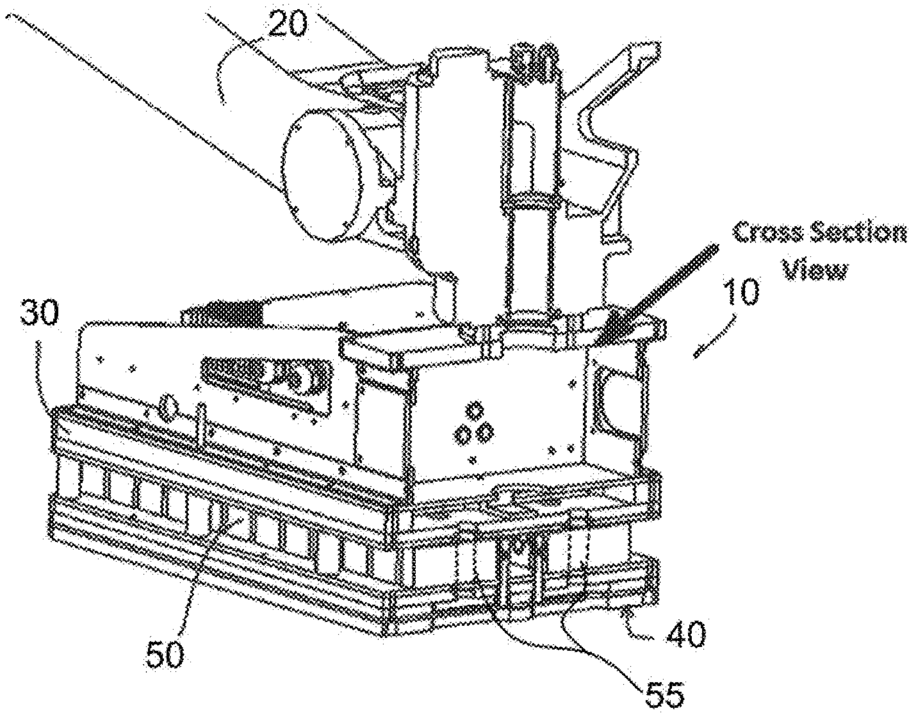
FIG. 4 is a cross-section front perspective view of the dual row vacuum EOAT shown in FIG. 1.

FIGS. 2-4 show the dual row vacuum EOAT mounted to a palletizing robot. FIGS. 3 and 4 show one preferred layout of multiple controllable vacuum zones in the dual row vacuum EOAT. The arrows in FIG. 3 represent the direction of flow of negative pressure through the dual row vacuum EOAT and the robotic arm 20 to the vacuum generator 90.

The invention as described maximizes the density at which the individually controllable vacuum zones are laid out to be able to provide a standardized layout of vacuum zones that maximizes the potential for not only the current desired product configurations, but also allows for expansion of future product sizes given the density of the zone pattern. By having multiple locations to turn vacuum zones off and on, the EOAT can be easily adaptable to more product sizes on the same EOAT. This is desirable to potential users as they often change product sizes, product counts, and or product unit load stacking patterns. These changes in the past could lead to the need to purchase new EOATs or change parts. With the subject invention, the future is built into the initial design and saves the user the need to purchase future additional components. The design is also done in a way to keep payload on the EOAT and the product it is picking within the capabilities of typical high speed palletizing robots in the market. By keeping this payload down, higher cycle speeds are provided on a lower cost palletizing robot.

The method of which the zones are densely packed from the use of multiple compact air powered spring mechanisms 55, such as shown in FIGS. 3 and 4, that allow the path of airflow to be switched through or blocked depending on the desire for that zone to be on or off. The air actuated spring is moved by air pressure supplied through a traditional air solenoid valve or solenoid 80 mounted on the top of the EOAT. This solenoid 80 is activated from a control voltage source such as a PLC 100 output. Once the spring is moved and air flow can then move from underneath the tool where the product is located, through the compact powered spring mechanism 55, and through the central air manifold 70 in the EOAT, ultimately to the powered vacuum generator 90. This creates the lift force required to lift the product or products. Multiple vacuum zones can be turned on to a single product or multiple products.

Figure 5:
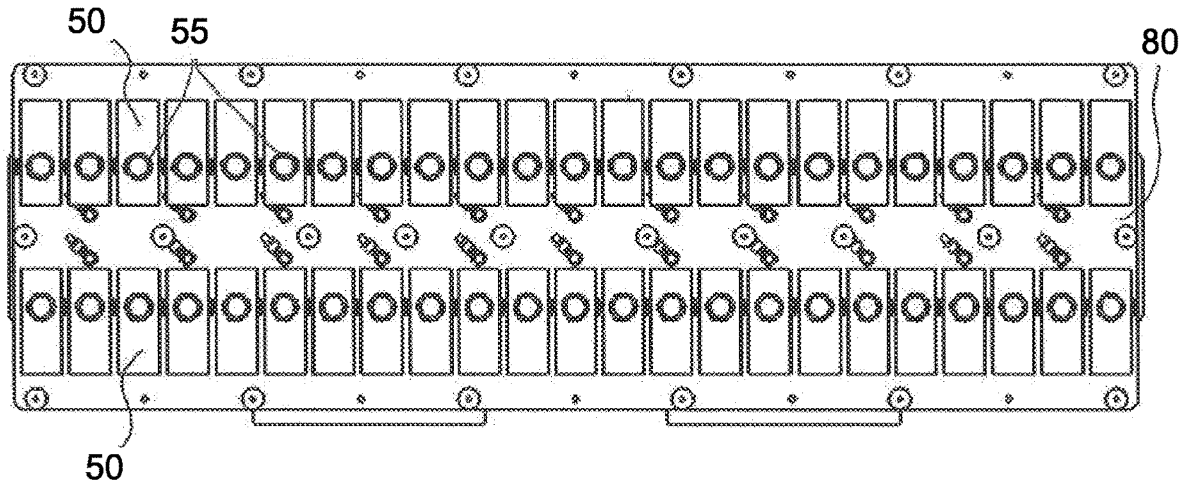
FIG. 5 is a cutaway top view of the dual row vacuum EOAT shown in FIG. 1.

The array of valves 50, such as the two-dimensional array shown in FIG. 5 also allows for not only product to be picked in a single product orientation such as short side leading or wide side leading but allows for multiple rows of products or a pre-collated mixed arrangement of product in multiple configurations. With the ability to pick up cases in multiple configurations, this can minimize the number of robot moves within a cycle when placing product in the unit load stacking pattern. This move optimization translates into more product throughput ability by the palletizing system. This satisfies a user need for increasing product throughput rates at their operations, such as at a palletizer.

An additional benefit to the approach of having a consistent, standardized layout, the software used to control which vacuum zone is turned off and on can also be standardized to a simple algorithm using product inputs and unit load specifications. Standardization of the software improves the initial commissioning of new products since mechanical changes are not driving software changes. The PLC may utilize a software recipe system to take various inputs such as case dimensions, unit load patterns, and some additional user inputs to determine the appropriate pick sequence (number of cases and case orientations). This software runs an algorithm based on these inputs to determine which vacuum zones in the array should be turned on to complete the desired pick sequence. This software is implemented in the palletizing control CPU or PLC as well as a proprietary recipe software manager, ROBOSTACK.

A corresponding method for transferring product between stations using the robotic arm 20 and the vacuum head 10 preferably includes the following steps. The product contact surface 40 of the housing 30 is configured at one end of the robotic arm 20 with the array of at least two rows and at least three ranks of valves 50. The solenoid 80 is provided in connection with the plurality of valves 50 to selectively activate air pressure in one or more valves 50 thereby enabling multiple switchable zones on the product contact surface 40. A planogram of products is assessed using the PLC 100 connected with respect to the solenoid 80 to automatically activate zones based on a desired product configuration. Products are then selectively transferred based upon the planogram.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A vacuum head for moving product at the end of a robotic arm, the vacuum head comprising:
- a housing having a product contact surface;
- an array of at least two rows and at least three ranks of valves;
- a solenoid connected with respect to each of the valves to selectively activate air pressure in one or more valves thereby enabling multiple switchable vacuum zones on the product contact surface; and
- a PLC configured to assess a planogram of products and connected with respect to the solenoid to automatically activate the one or more valves to enable one or more of the multiple switchable vacuum zones based on the planogram of products.

2. The vacuum head of claim 1 wherein each valve comprises an air powered spring mechanism.

3. The vacuum head of claim 2 wherein each air powered spring mechanism extends directly to a channel on the product contact surface.

4. The vacuum head of claim 1 wherein the array of valves comprises at least twenty ranks.

5. The vacuum head of claim 1 further comprising a central air manifold within the housing connected between the robotic arm and the plurality of valves.

6. The vacuum head of claim 5 further comprising a powered vacuum generator positioned within the robotic arm providing a vacuum to the central air manifold.

7. A method for transferring product between stations using a robotic arm and a vacuum head, the method comprising:

configuring a product contact surface of a housing at an end of the robotic arm with an array of at least two rows and at least three ranks of valves;

providing a solenoid in connection with the plurality of valves to selectively activate air pressure in one or more valves thereby enabling multiple switchable zones on the product contact surface;

assessing a planogram of products using a PLC connected with respect to the solenoid to automatically activate zones based on a desired product configuration; and selectively transferring the product based upon the planogram.

8. The method of claim 7 further comprising actuating each valve of the plurality of valves between an on position and an off position along the product contact surface.

9. The method of claim 7 further comprising transferring product in a wide side leading configuration and a short side leading configuration within a common cycle.

10. The method of claim 7 wherein the plurality of valves each comprise an air powered spring mechanism.

11. The method of claim 10 wherein each separate actuatable spring is switchable between an on position and an off position.

12. The method of claim 7 further comprising providing a central air manifold within the housing connected between the robotic arm and the plurality of valves.

* * * * *